(12) United States Patent
Woodell et al.

(10) Patent No.: US 7,859,448 B1
(45) Date of Patent: Dec. 28, 2010

(54) TERRAIN AVOIDANCE SYSTEM AND METHOD USING WEATHER RADAR FOR TERRAIN DATABASE GENERATION

(75) Inventors: Daniel L. Woodell, Cedar Rapids, IA (US); Richard D. Jinkins, Rewey, WI (US); Nathanael A. Meyer, Coralville, IA (US); Richard M. Rademaker, Rijswijk (NL); Charles J. Dickerson, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 665 days.

(21) Appl. No.: 11/899,801

(22) Filed: Sep. 6, 2007

(51) Int. Cl.
*G01S 13/95* (2006.01)
(52) U.S. Cl. ...................... 342/26 B; 342/65
(58) Field of Classification Search .............. 342/26 R, 342/26 A–26 D, 65, 179
See application file for complete search history.

(56) References Cited

U.S. PATENT DOCUMENTS

| | | | |
|---|---|---|---|
| 5,920,276 A * | 7/1999 | Frederick | 342/26 B |
| 5,945,926 A * | 8/1999 | Ammar et al. | 340/970 |
| 5,978,715 A * | 11/1999 | Briffe et al. | 701/11 |
| 6,064,942 A | 5/2000 | Johnson et al. | |
| 6,128,553 A | 10/2000 | Gordon et al. | |
| 6,150,901 A | 11/2000 | Auken | |
| 6,154,151 A | 11/2000 | McElreath et al. | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,194,980 B1 | 2/2001 | Thon | |
| 6,201,494 B1 | 3/2001 | Kronfeld | |
| 6,233,522 B1 * | 5/2001 | Morici | 701/208 |
| 6,259,400 B1 | 7/2001 | Higgins et al. | |
| 6,266,114 B1 | 7/2001 | Skarohlid | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,311,108 B1 * | 10/2001 | Ammar et al. | 701/16 |
| 6,317,468 B1 | 11/2001 | Meyer | |
| 6,345,127 B1 | 2/2002 | Mitchell | |
| 6,377,892 B1 | 4/2002 | Johnson et al. | |
| 6,388,607 B1 | 5/2002 | Woodell | |
| 6,388,608 B1 | 5/2002 | Woodell et al. | |
| 6,424,288 B1 | 7/2002 | Woodell | |

(Continued)

OTHER PUBLICATIONS

Vadlamani, A.; de Haag, M.U.; , "Improving the detection capability of spatial failure modes using downward-looking sensors in terrain database integrity monitors," Digital Avionics Systems Conference, 2003. DASC '03. The 22nd , vol. 2, no., pp. 9.C.5- 91-12 vol. 2, Oct. 12-16, 2003.*

(Continued)

*Primary Examiner*—John B Sotomayor
(74) *Attorney, Agent, or Firm*—Matthew J. Evans; Daniel M. Barbieri

(57) ABSTRACT

An aircraft weather radar system can be used with a terrain avoidance system to provide a terrain database. The weather radar system includes a processor and/or other electronics coupled to an antenna. The processor determines terrain data based on weather radar returns received from the antenna. The processor can utilize a variety of techniques for determining terrain data or estimates.

15 Claims, 3 Drawing Sheets

U.S. PATENT DOCUMENTS

| | | |
|---|---|---|
| 6,426,717 B1 | 7/2002 | Maloratsky |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,473,240 B1 | 10/2002 | Dehmlow |
| 6,492,934 B1 | 12/2002 | Hwang et al. |
| 6,501,424 B1 | 12/2002 | Haendel et al. |
| 6,512,476 B1 | 1/2003 | Woodell |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,603,425 B1 | 8/2003 | Woodell |
| 6,650,275 B1 | 11/2003 | Kelly et al. |
| 6,653,947 B2 * | 11/2003 | Dwyer et al. ............... 340/970 |
| 6,690,298 B1 | 2/2004 | Barber et al. |
| 6,690,299 B1 | 2/2004 | Suiter |
| 6,714,186 B1 | 3/2004 | Mosier et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,804,614 B1 | 10/2004 | McGraw et al. |
| 6,806,846 B1 | 10/2004 | West |
| 6,819,983 B1 | 11/2004 | McGraw |
| 6,822,617 B1 | 11/2004 | Mather et al. |
| 6,839,017 B1 | 1/2005 | Dillman |
| 6,850,185 B1 | 2/2005 | Woodell |
| 6,862,501 B2 * | 3/2005 | He ................................. 701/3 |
| 6,865,452 B2 * | 3/2005 | Burdon ........................ 701/3 |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,950,062 B1 | 9/2005 | Mather et al. |
| 6,972,727 B1 | 12/2005 | West et al. |
| 6,977,608 B1 | 12/2005 | Anderson et al. |
| 6,995,726 B1 | 2/2006 | West et al. |
| 6,998,908 B1 | 2/2006 | Sternowski |
| 6,999,022 B1 | 2/2006 | Vesel et al. |
| 7,002,546 B1 | 2/2006 | Stuppi et al. |
| 7,034,753 B1 | 4/2006 | Elsallal et al. |
| 7,042,387 B2 * | 5/2006 | Ridenour et al. .......... 342/26 B |
| 7,064,680 B2 * | 6/2006 | Reynolds et al. ............ 340/961 |
| 7,089,092 B1 | 8/2006 | Wood et al. |
| 7,092,645 B1 | 8/2006 | Sternowski |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,196,329 B1 | 3/2007 | Wood et al. |
| 7,205,933 B1 | 4/2007 | Snodgrass |
| 7,219,011 B1 | 5/2007 | Barber |
| 7,242,343 B1 | 7/2007 | Woodell |
| 7,272,472 B1 | 9/2007 | McElreath |
| 7,292,178 B1 | 11/2007 | Woodell et al. |
| 7,312,725 B2 * | 12/2007 | Berson et al. ............... 340/980 |
| 7,312,743 B2 * | 12/2007 | Ridenour et al. .......... 342/26 B |
| 7,486,291 B2 * | 2/2009 | Berson et al. ............... 345/427 |
| 7,570,177 B2 * | 8/2009 | Reynolds et al. ............ 340/961 |
| 7,633,430 B1 * | 12/2009 | Wichgers et al. ............. 342/65 |
| 7,639,175 B1 * | 12/2009 | Woodell ..................... 342/123 |
| 7,675,461 B1 * | 3/2010 | McCusker et al. .......... 342/179 |
| 7,733,264 B1 * | 6/2010 | Woodell et al. ........... 342/26 B |
| 2003/0071828 A1 * | 4/2003 | Wilkins et al. .............. 345/619 |
| 2003/0216859 A1 | 11/2003 | Martell et al. |
| 2004/0044445 A1 * | 3/2004 | Burdon ........................ 701/3 |
| 2004/0059473 A1 * | 3/2004 | He ................................. 701/4 |
| 2004/0083038 A1 * | 4/2004 | He ................................. 701/3 |
| 2004/0181318 A1 * | 9/2004 | Redmond et al. ............. 701/9 |
| 2005/0174350 A1 | 8/2005 | Ridenour et al. |
| 2006/0097895 A1 | 5/2006 | Reynolds et al. |
| 2006/0227012 A1 * | 10/2006 | He ............................... 340/945 |
| 2006/0290531 A1 * | 12/2006 | Reynolds et al. ............ 340/961 |
| 2009/0207048 A1 * | 8/2009 | He et al. ...................... 340/973 |
| 2010/0033499 A1 * | 2/2010 | Gannon et al. .............. 345/629 |

OTHER PUBLICATIONS

Johnson, A.; Montgomery, J.; Matthies, L.; , "Vision Guided Landing of an Autonomous Helicopter in Hazardous Terrain," Robotics and Automation, 2005. ICRA 2005. Proceedings of the 2005 IEEE International Conference on , vol., no., pp. 3966-3971, Apr. 18-22, 2005.*

Fountain, J.R.; , "Digital terrain systems," Airborne Navigation Systems Workshop (Digest No. 1997/169), IEE Colloquium on , vol., no., pp. 4/1-4/6, Feb. 21, 1997.*

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

* cited by examiner

TERRAIN AVOIDANCE SYSTEM AND METHOD USING WEATHER RADAR FOR TERRAIN DATABASE GENERATION

CROSS-REFERENCE TO RELATED APPLICATIONS

This application is related to U.S. application Ser. No. 11/900,002 entitled "SYSTEM AND METHOD FOR A TERRAIN DATABASE AND/OR POSITION VALIDATION" by Woodell et al., and U.S. application Ser. No. 11/851,323 entitled "SYSTEM AND METHOD FOR SENSOR-BASED TERRAIN AVOIDANCE" by McCusker, both filed on an even date herewith and assigned to the Assignee of this patent application and incorporated herein by reference.

BACKGROUND OF THE INVENTION

The present specification relates to terrain warning systems. Conventionally, pilots use terrain warning systems such as terrain awareness and warning systems (TAWS), ground proximity warning systems (GPWS), and enhanced GPWS (EGPWS). Terrain warning systems have been designed to provide critical information to pilots and flight crews to reduce aviation accidents related to controlled flight into terrain.

Terrain warning systems generally can provide visual and audio warnings to prevent controlled flight into terrain. Terrain warning systems generally are coupled with a visual display and an audio system and receive positional information related to the aircraft's actual or relative position. Terrain warning systems receive various input criteria about location (e.g., latitude, longitude, and altitude) of the aircraft as well as its speed and direction of travel (e.g., heading). Terrain warning systems map the input criteria to a terrain database. The result can be used to indicate that the aircraft is in danger of hitting the terrain as represented by the terrain database.

The visual or audio warning issued by the terrain warning system can include instructions for evasive maneuvers to the pilot. The warnings can be generated from a conventional terrain awareness algorithm or from a radio altitude/aircraft state system.

The terrain warning system can receive input criteria from a variety of sources. For example, the aircraft's position can be provided by a flight management system, a global positioning system, an inertial navigation system, pilot input, or any other position sensing device. In addition, redundant sensors can be utilized. For example, altitude can be determined both from a GPS system and an onboard altimeter.

The terrain database can be referenced to particular locations (e.g., latitude, longitude, altitude, etc.) and stored on non-volatile memory such as hard drives. Some databases are local or regional while others are global. Generally, conventional terrain warning systems have utilized databases based upon information generated prior to the flight of the aircraft. Some of the data can be relatively old and require updated information related to man-made objects, such as buildings, radio towers, bridges, etc. Such systems can be prone to false alarms due to database inaccuracy/resolution and missed hazardous states due to new terrain obstacle/features.

Accordingly, there is a need for a system that can generate an in-flight estimate of terrain elevation for a TAWS, RTAWS, or GPWS. There is also a need to determine a terrain elevation estimate using an aircraft sensor. There is further a need to sense terrain elevation in real time or pseudo real time for a terrain warning system. Yet further, there is a need for an accurate low cost method of generating terrain elevation.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a method of generating a terrain elevation database for a terrain avoidance system on an aircraft using a weather radar system. The method includes sensing terrain elevation using the weather radar system, and storing the terrain elevation.

Another exemplary embodiment relates to an aircraft weather radar system for use with a terrain avoidance system. The weather radar system includes an antenna, and a processor coupled to the antenna. The processor uses weather radar returns received from the antenna to determine terrain elevation data for use by a terrain avoidance function.

Still another exemplary embodiment relates to a terrain elevation database for an aircraft terrain avoidance system. The terrain elevation database includes an input, and a storage. The input is configured to receive terrain elevation estimates derived from an onboard weather radar system.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
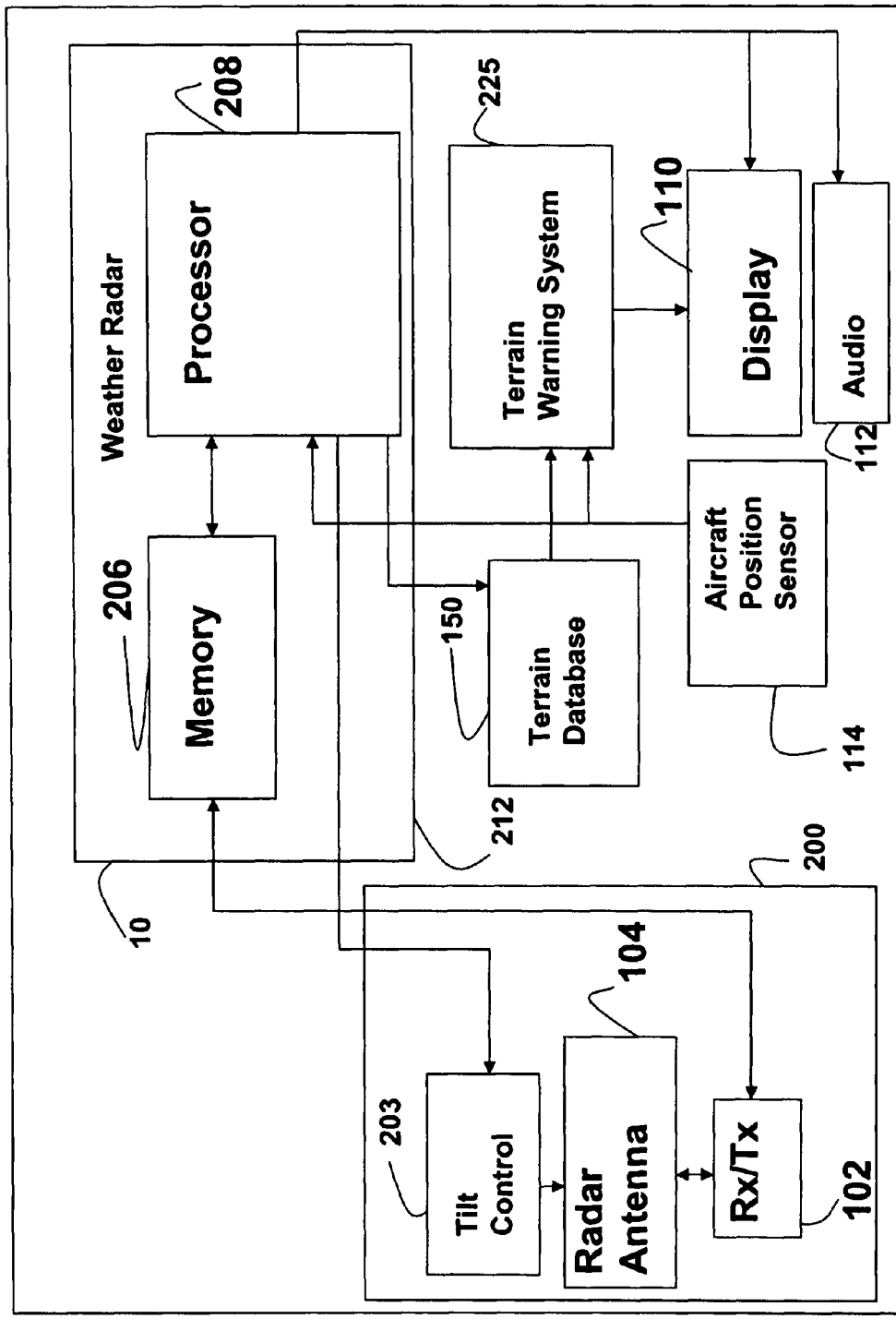
FIG. 1 is a general block diagram of a terrain warning system using a terrain database built by a weather radar system in accordance with an exemplary embodiment.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an aircraft 100 includes a weather radar system 10, a terrain warning system 225, and an antenna system 200. Antenna system 200 of weather radar system 10 is capable of casting a radar beam(s) and receiving reflective energy from weather systems, terrain, and other obstacles. Weather radar system 10 preferably produces the beam(s) and receives reflectivity energy from various targets while the information is accumulated by a local database and is available for processing by terrain warning system 225. In one embodiment, the local database can be a terrain elevation database 150.

Weather radar system 10 can be similar to the system described in U.S. Pat. No. 6,388,608. Alternatively, weather radar system 10 can be a radar-based wind shear detection system or a monopulse radar system. Advantageously, system 10 is capable of providing terrain elevation estimates or data to a terrain database 150 for use with terrain warning system 225. According to one embodiment, the terrain elevation estimates are provided real time or almost real time as aircraft 100 is operated.

Aircraft 100 preferably includes an antenna system 200 including a tilt control 203, a radar antenna 104, and a receiver/transmitter circuit 102. System 100 preferably includes a processor 208 and a memory 206. System 100 is coupled to display 110 which can be a multi-function flight display, a dedicated display, or any type of visual display.

In a preferred embodiment, weather radar system 10 is configured to provide terrain elevation estimates and system 225 utilizes terrain elevation database 150 to provide terrain warnings or terrain avoidance instructions via display 110 or an audio system 112. Although system 10 and 225 are shown as distinct systems, they can be provided as a single system or as parts of other systems or other electronics associated with aircraft 100.

System 225 can be any type of TAWS system that uses a terrain elevation database. System 225 is preferably coupled to a terrain elevation database 150 for receiving terrain elevation estimates. System 225 can be configured to provide warnings and corrective actions to prevent controlled flight into terrain. System 225 can include basic ground proximity warning system (GPWS) alerts, forward-looking terrain avoidance (FLTA), and premature descent alerting (PDA) functions. System 225 can operate according to FAA technical standard order TSO-C115b.

Processor 208 can utilize a variety of techniques for determining or generating terrain elevation estimates for terrain elevation database 150. In one embodiment, processor 208 is configured to have system 10 provide multiple beams swept in azimuth that have different beam elevations. The multiple beams can be used to determine an angle to terrain features using the difference in return power to estimate the target angle within the beam. Using the range with both this intra-beam angle and the beam's center angle, the altitude of the terrain can be determined relative to the altitude of aircraft 100. The use of multiple beams is similar to target angle estimation by lobing between different antennas, each pointing at a different elevation in the terrain detection case. Just as amplitude can be compared between two beams so can the received signal phase to produce a classic monopulse or sequential lobing estimate of the target angle within the beam set.

In another alternative, antenna 104 can be controlled in a single azimuth sweep while the data used to support terrain height estimation is taken with either a vertical monopulse antenna or vertically orientated sequential lobed antenna. In yet another alternative, the antenna may have vertically swept beams using monopulse antennas and receivers to create terrain data or estimates. Such systems have been utilized in military terrain following and terrain alerting (TF/TA) systems. Advantageously, the use of system 10 allows an existing onboard system of aircraft 100 to provide a low-cost integration for onboard calculation of terrain elevation estimates for a terrain elevation database 150.

Processor 208 can receive altitude information from aircraft position sensor 114 to determine the elevation of the terrain, obstacle or feature of the terrain. Sensor 114 can be a GPS system, an altimeter, radar altimeter, etc. Alternatively, processor 208 can provide a relative terrain data which is used by terrain warning system 225 to determine the sensed terrain elevation.

The terrain elevation estimates can be provided in a variety of forms. In the preferred embodiment, terrain elevation estimates are referenced to mean sea-level in height. Aircraft altitude is generally referenced to mean sea-level. The terrain data is preferably referenced to location (e.g., latitude, longitude, etc.). Images representative of the terrain data can be displayed as a grayscale or color on an X-Y plane, where colors, darkness or lightness represent altitude. The terrain data can also be provided as a relative terrain with respect to the altitude of the aircraft or flight plan.

Database 150 can be configured in variety of fashions. In one embodiment, database 150 is addressed with respect to geographic location. In another embodiment, database 150 can be addressed with respect to its relative position with respect to the aircraft.

In a preferred embodiment, weather radar system 10 is a pulse Doppler radar system. System 10 preferably includes a weather radar return processing unit (e.g., processor 208) that can calculate standard deviations of wind velocities, a mean velocity parameter, a spectral width parameter, a range parameter, a weather height parameter and reflectivity parameter to generate turbulence alerts, and to provide a display signal to display 110. System 10 is also capable of recording historical data for use in cell growth analysis. In one embodiment, system 10 detects reflectivity by measuring the power of the returned signal. Velocity is measured by detecting changes in phase angle of returned pulses. Spectral width is measured by detection variation in change of phase angle of returned pulses. Cell height is determined by comparing return power levels at different tilt angles or by examining data from a volumetric memory representing different altitudes. Alternatively, system 10 can be a monopulse system.

Display 110 preferably provides color graphical images corresponding to the intensity of the radar returns. The graphical images can represent weather regions, rainfall densities, turbulence regions, etc. System 225 can cause display 110 to provide visual indications of potential hazards (e.g., obstacles and terrain) including icons. In one embodiment, audio alerts are also provided on audio equipment 112.

System 10 can be a WXR-2100 MultiScan™ radar system or similar system manufactured by Rockwell Collins configured to include the features associated with terrain database 150. According to certain embodiments, system 10 can be an RDR 4000 system or similar system manufactured by Honeywell International, Inc. configured to include the features associated with terrain elevation database 150. The principles of the present invention are applicable to any aircraft weather radar system. The present invention is not limited to any type of hardware platform.

In operation, processor 208 of system 10 provides signals, either directly to receiver/transmitter circuit 102 or indirectly through memory 206, to provide radar beams at radar antenna 104. Preferably, processor 208 is configured to operate system 10 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206. Receiver/transmitter circuit 102 can be a single path or can have separate circuits for a receive path and a transmit path. Processor 208 can use radar returns to determine a reflectivity parameter, a mean velocity parameter and/or a spectral width parameter for use by system 10. Processor 208 executes software to effect terrain sensing and weather sensing operations.

Figure 2:
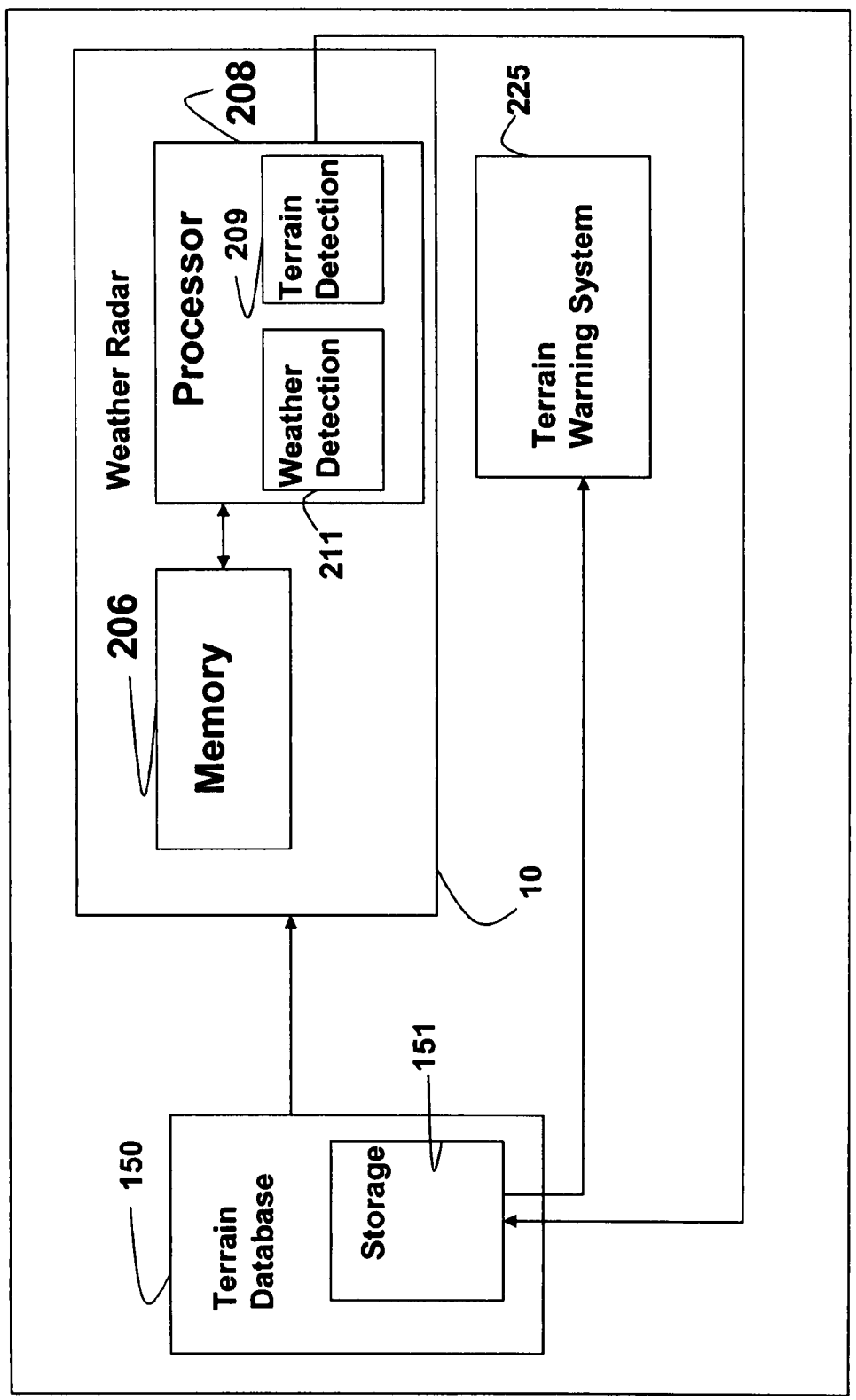
FIG. 2 is a more detailed block diagram of the weather system and the terrain warning system illustrated in FIG. 1 in accordance with another exemplary embodiment.

With reference to FIG. 2, terrain database 150 receives an input from weather radar system 10. Preferably, terrain elevation estimates are provided to storage 151 of terrain elevation database 150.

Preferably, processor 208 includes a weather detection software module 211 for determining the presence of weather in response to weather radar returns and a terrain detection software module 209 for determining the presence of terrain and obstacles in response to weather radar returns. Modules 211 and 209 preferably operate on the weather radar computing platform associated with system 10. System 10 preferably alternates between weather detection and terrain detection as the flight of aircraft 100 occurs or uses antenna/transmitter pulse patterns that may be used for both the weather and terrain detection function. Dual pulse patterns advantageously reduce the total number of antenna sweeps needed to collect the different kinds of needed data (e.g., for windshear, weather, terrain, obstacle, and runway confirmation).

In one embodiment, system 10 removes data that is related to weather detected by processor 208 before it is stored in storage 151. In this embodiment, system 10 advantageously filters or subtracts out returns from the terrain elevation estimates that are associated with weather features but not with terrain features.

Such a system 10 can utilize various weather detection techniques to determine whether the feature is actual weather. For example, the estimated altitude of the feature associated with the weather radar returns can be compared to a generalized terrain database to determine if it is weather or terrain feature. (E.g., a feature at an unusually high altitude in a plain region is more likely to be weather than terrain.) System 10 can be configured to ignore a feature if its height is well above known parameters (e.g., height is above an error factor for the region).

Alternatively, other radar features and signatures can be utilized to determine whether the return is associated with terrain. Doppler conditions can be monitored to detect movement. Doppler mean frequencies can be estimated from radar return data. The difference between the estimated ground modeled Doppler and the radar derived target estimated Doppler frequency may be used to separate ground returns from weather returns. Alternatively, the radar data may be filtered in the frequency domain to reject weather information.

In one embodiment, storage 151 is sized to provide terrain data associated with the flight path. As aircraft 100 passes locations with stored data, storage 151 can over-write these locations with new data from locations in front of the aircraft 100. Alternatively, storage 151 is a global storage base or regional storage base associated with aircraft 100. Storage 151 is gradually built as aircraft flies from destination to destination. If aircraft 100 passes over the same terrain, the existing data in storage 151 can be rewritten or can be averaged to provide new data for the location. In this way, inaccuracies associated with a particular flight path can be reduced as the aircraft passes over the same route. In one embodiment, the averaging can be a weighted average in which older data does not contribute as much to the average as newer data.

Figure 3:
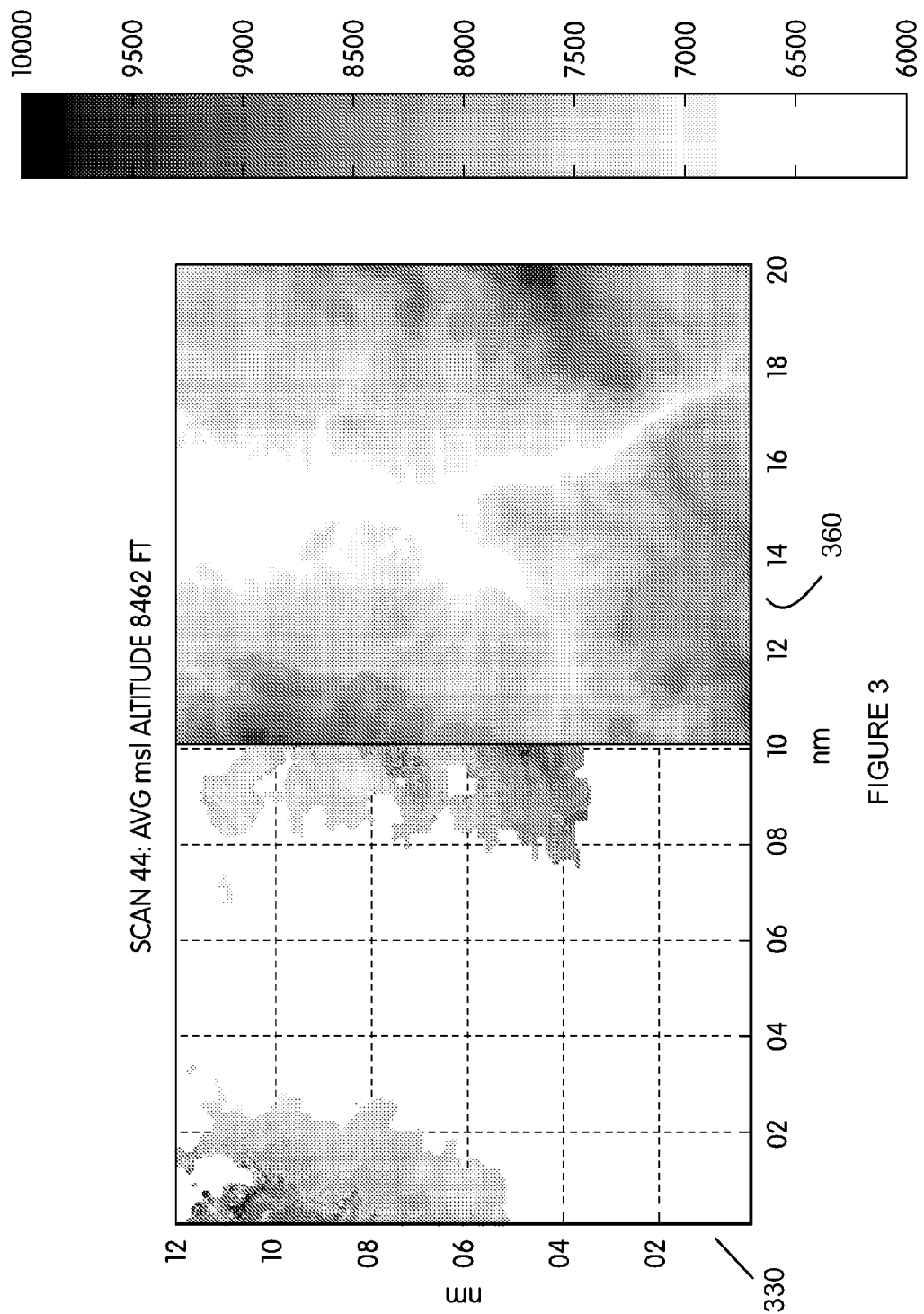
FIG. 3 is a drawing representing terrain elevation estimates sensed by a weather radar system and terrain elevation data from a conventional database in accordance with another exemplary embodiment.

With reference to FIG. 3, terrain elevation estimates generated by weather radar system 10 can be represented as an image 330. Image 330 can be provided on display 110. An image 360 represents a conventional terrain elevation database for the same region.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of generating a terrain elevation database for a terrain avoidance system on an aircraft using a weather radar system, the method comprising:
    sensing terrain elevation using the weather radar system; and
    storing a representation of the terrain elevation in the terrain elevation database,
    wherein the power ratio associated with the weather radar returns is used to determine the terrain elevation.

2. The method of claim 1, wherein the terrain elevation height is determined using multiple scan techniques.

3. The method of claim 1, wherein the weather radar returns are from a monopulse radar.

4. The method of claim 1, wherein the representation of the terrain elevation is averaged with a stored representation terrain elevation in the terrain elevation database for the same location.

5. The method of claim 1, wherein the weather radar returns are from a sequential lobing radar.

6. A method of generating a terrain elevation database for a terrain avoidance system on an aircraft using a weather radar system, the method comprising:
    sensing terrain elevation using the weather radar system; and
    storing a representation of the terrain elevation in the terrain elevation database,
    wherein weather radar returns from multiple beams swept in azimuth and with different beam elevations are used in the sensing step.

7. The method of claim 6, wherein differences in power or phase of the radar returns are used to determine the terrain elevation.

8. An aircraft weather radar system for use with a terrain avoidance system, the weather radar system being coupled to an antenna, the weather radar system comprising:
    a processor for receiving weather radar returns received by the antenna, the processor estimating terrain elevation estimates for use with the terrain avoidance system, wherein the weather radar returns associated with the weather are removed before calculating the terrain elevation estimates.

9. The system of claim 8, wherein the estimates are derived from weather radar returns associated with a monopulse or sequential lobing technique.

10. The system of claim 8, wherein the weather radar system is a multi-scan system.

11. The system of claim 8, wherein the processor overwrites the previous terrain elevation database values with new terrain elevation estimates for the same location.

12. The system of claim 8, wherein the processor averages the terrain elevation estimates for the same location.

13. The system of claim 8, wherein the terrain elevation estimate is compared to a generalized terrain elevation for the region and disregarded if the terrain-elevation estimate is outside an error parameter.

14. The system of claim 8, wherein the terrain elevation estimates are relative to the aircraft current position.

15. The system of claim 14, wherein the stored terrain elevation database is overwritten.

\* \* \* \* \*